United States Patent Office 2,745,997
Patented May 15, 1956

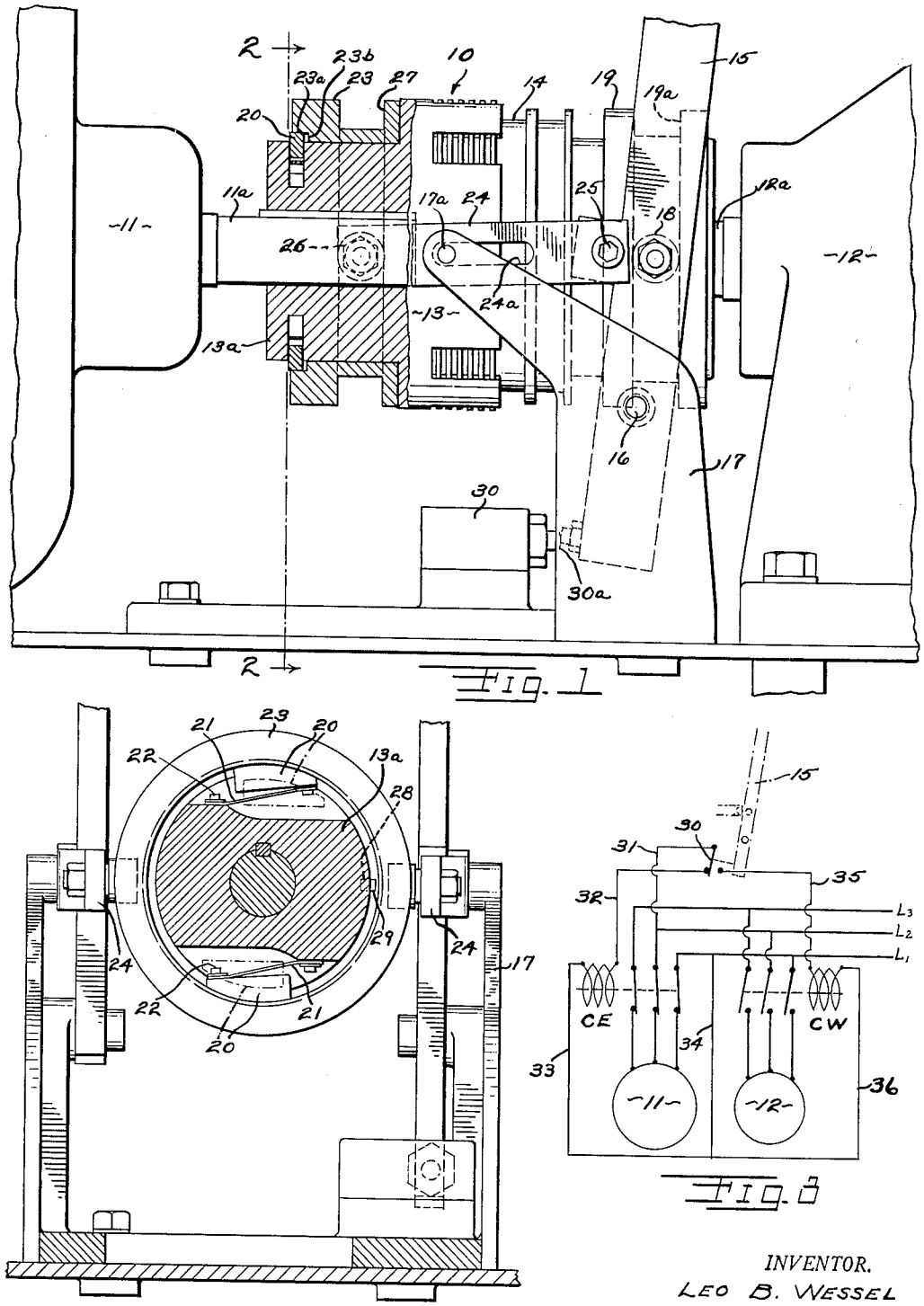

2,745,997
CLUTCH CONTROL FOR PLURAL MOTOR UNIT

Leo B. Wessel, Cincinnati, Ohio, assignor to The American Laundry Machinery Company, Cincinnati, Ohio, a corporation of Ohio Application July 23, 1953, Serial No. 369,779

5 Claims. (Cl. 318—102)

This invention relates to improvements in a clutch control for preventing coupling of two shafts while one is rotating substantially faster than the other, but permitting coupling of said shafts when the speed of the higher speed shaft is at such a rate as to make coupling safe.

Another object of the present invention is to provide in the organization of a high speed motor and a low speed motor, each of said motors having a driven shaft and clutch means operatively associated with said shafts for coupling and uncoupling them, of control means operatively connected with the high speed motor and movable at a predetermined speed of said high speed motor shaft to a blocking position preventing coupling of said clutch means.

A further object of the present invention is to provide in the combination defined in the preceding paragraph, resilient means operatively associated with the clutch blocking means for urging the blocking means out of blocking position at safe coupling speeds of the high speed motor shaft.

Other objects and advantages of the present invention will be apparent from the accompanying drawings and description and the essential features will be set forth in the appended claims.

In the drawings, Fig. 1 is a side elevational view showing portions of high speed and low speed motors with clutch means for coupling the shafts together, parts being broken away to more clearly show the blocking means preventing coupling of the clutch when the speed of the high-speed motor shaft is too great.

Fig. 2 is a transverse sectional view of the same taken along the line 2—2 of Fig. 1, while Fig. 3 is an electrical wiring diagram of a suitable circuit for operating my device.

One application of my invention is shown in the copending application of Harvey I. Sheffer, filed July 8, 1953, Serial No. 366,670, for Safety Door Lock and Control for Washing Machines, but other applications will occur to those familiar with this art. It has become rather common practice to drive such a two-speed machine by high and low-speed motors respectively, using one drive pulley coupled with the output shaft of the high-speed motor. Such a device, when driving at low speed, is operated by means of the low-speed motor drive, which drives through the idle high-speed motor. In such a combination, when the high-speed motor is energized, the low-speed motor should not be driven thereby, particularly since the low-speed drive is generally, as here shown, a geared-down unit.

A common expedient in the past has been to couple the two drive shafts by some form of over-running clutch. This allows the low-speed unit to drive through the high-speed motor shaft, but when the latter is energized and rotates faster than the slower motor, a ratchet or over-running mechanism slips to allow this action. Thus, the low-speed unit may continue to rotate at its usual rate and subsequently again picks up the drive when the high-speed motor drops to the safe low speed. While such over-running clutches are fairly satisfactory, they tend to wear and otherwise require repair rather frequently.

In contrast to the above, a conventional clutch which is either completely engaged or completely disengaged is naturally less subject to trouble. However, if such a clutch is used between a high-speed and a low-speed driver, there is a chance that the clutch will inadvertently be moved into engagement while the high-speed motor is running at a speed which will damage the mechanism. The present invention is designed to allow the use of any ordinary positive engagement clutch and yet prevent the above mentioned coupling at high speed.

Referring now to Figs. 1 and 2, the invention is shown applied to a commercially available clutch 10 of the multiple disc type. It will be understood that it could be applied in the same manner to a cone clutch or any other clutch of this general nature. The motor 11 is a high-speed electrical motor having an output shaft, not shown, but aligned with the shaft 11a. The motor 11 corresponds to the extractor motor of the above mentioned copending application of Harvey I. Sheffer. The motor 12 is a low-speed electrical motor or, preferably, a geared-down unit coupled with such a motor and corresponding to the washing motor of the above mentioned copending Sheffer application. This motor has an output or driven shaft 12a. The clutch 10 has an element or group of elements 13 coupled with or rotatable with the shaft 11a. The clutch has another element or group of elements represented by the reference character 14, which are coupled with or rotatable with the shaft 12a. That portion of the clutch indicated at 14 is movable axially toward or from the element 13 to cause positive clutch engagement or movable axially toward the right as viewed in Fig. 1 to cause positive disengagement of the clutch. To effect this movement of the part 14, a bifurcated lever 15 is pivotally mounted at 16 in bracket 17, which is fixed to the main frame. The lever 15 carries rollers 18 positioned in a groove 19a of a collar 19 connected with clutch element 14, so that movement of the lever 15 toward the left in Fig. 1 moves the clutch element 14 into engagement with the clutch element 13, while movement of lever 15 toward the right in Fig. 1 disengages the clutch.

When the clutch is disengaged, the extractor motor 11 may be operated to drive the washing machine drum of the copending Sheffer application at high-speed. Then a usual sequence would be to drive at low speed for another suds bath or a rinse bath. With the clutch 10 disengaged, and the motor 11 still revolving at a relatively high speed, my invention prevents the shifting of the clutch members into engagement until the speed of the motor 11 has been lowered to a value where it may be safely coupled to the driving shaft 12a. To accomplish this, abutments in the form of fly weights 20 are mounted for rotation with motor 11 and shaft 11a, so that they will move radially outwardly at the higher speeds which render clutch engagement dangerous, and thus form a block or abutment against axial shifting movement of the clutch portion 14 toward the left in Fig. 1 to engage the clutch 10. To mount the weights 20, as shown, the hub 13a of the clutch member 13 is provided with milled slots extending transversely thereof and diametrically opposite each other and the fly weights 20 are mounted in these slots for radial movement inwardly and outwardly. These weights are secured in position by resilient flat narrow springs 21 which are fastened to the hub 13a at 22. The springs 21 are of such a stiffness that they hold the weights 20 radially within the outer periphery of the hub 13a (in the dot-dash position of Fig. 2) at rotational speeds approximately equal to or, if desired, slightly below that of the drive shaft 12a. At such speeds, the centrifugal forces on the weights 20 is overcome or balanced by the springs 21 to hold the weights in the dot-dash position of Fig. 2. At higher speeds than this, the weights 20 move out as shown in full lines in Figs. 1 and 2 to a position where they form abutments. At higher speeds than that just mentioned, the weights 20 move radially outwardly to the position shown in full lines in Figs. 1 and 2; in this position they bear radially outwardly against the internal cylindrical surface of a recess 23a formed in the end of a sleeve 23 which snugly but slidably surrounds the hub 13a. The recess 23a has a shoulder 23b which is axially aligned with and abuts against the weights 20 when they are in their outermost position as shown in Figs. 1 and 2. This prevents movement toward the left in Fig. 1 of the clutch portion 14 and therefore, in this position of the parts, it prevents engagement of the clutch 10.

The sleeve 23 is linked to the shifting lever 15 by means of a pair of link bars 24 which are pivotally connected at one end by pivots 25 engaging the lever. Each link bar has a roller 26 at the opposite end riding in a circumstantial groove 27 in the sleeve 23. Lengthwise slots 24a in the link bars cooperate with pins 17a of the bracket 17 to support the link bars in proper position while allowing the required endwise movement during clutch shifting. Relative rotation between hub 13a and sleeve 23 is preferably prevented by means of a slide key or spline 28 positioned in hub 13a and extending into keyway 29 in the sleeve 23.

In the embodiment shown, the operation of the clutch shifting lever 15 is tied in with a control switch for the motors 11 and 12 so as to insure correct operation of the motors in relation to the clutch. The switch 30, shown, is of the double pole type having an actuator 30a which is normally urged toward the right as shown in Fig. 1, although two separate switches might be used. The switch 30 is mounted on the main frame so that the actuator 30a is engaged by a button on the lower end of the shift lever 15 when the parts are in position corresponding to disengagement of the clutch 10. In this position, the switch is in its left-hand position as shown in the diagram of Fig. 3. When the clutch shifting lever 15 is moved in a counterclockwise direction from the position of Fig. 1, the switch actuator 30a is released and the switch moves toward the right-hand contact shown in Fig. 3.

Suitable operating circuits for motors 11 and 12 are shown diagrammatically in Fig. 3. With the parts in the position corresponding to Figs. 1 and 2, with the clutch disengaged, the switch 30 is closing its left-hand contact as shown in Fig. 3. A circuit then goes from L2, line 31, switch 30, line 32, coil CE of the extractor motor contactor, and lines 33 and 34 to L1. The contactor is thus operated and connects extractor motor 11 to electrical supply lines L1, L2, and L3. The motor 12 is not energized at this time.

When the machine is ready to go into the low-speed phase, the shifting lever 15 is moved counterclockwise as viewed in Fig. 1. Only a short movement is possible before the sleeve 23 is stopped by the weights 20, but it is sufficient to allow the switch 30 to snap over to its normal position, breaking the contact at the left-hand contactor button shown in Fig. 3 so as to open the circuit above described to the coil CE, deenergizing motor 11. At the same time, the switch 30 moves against the right-hand contact button shown in Fig. 3 and completes a circuit through line 35, coil CW of the wash motor contactor, and lines 36 and 34 to L1. This starts the wash motor 12. Then, when the speed of motor 11 has dropped sufficiently, the weights 20 will return radially inwardly from the position shown in Figs. 1 and 2 in full lines to the dot-dash position of Fig. 2. This permits the clutch to be shifted into full engagement as previously described.

It should be understood that the shift lever 15 is moved toward the left in Fig. 1 while so attempting to engage the clutch, in a light manner from time to time so as to avoid binding action against the weights or abutments 20. Obviously, the relative amount of free movement of the shifting lever 15, the free travel of the clutch part 14, and the positioning of the switch 30 are dependent upon the particular design in any given case.

I have thus provided a positive clutch for the connecting of high-speed and low-speed motors to a common driving shaft with suitable mechanical arrangements to prevent the engagement of the clutch until the high-speed motor has dropped to a safe speed for the engagement of the clutch connected with the low-speed motor. At the same time, the electrical control circuits for the two motors are interconnected with the clutch shifting arrangement so as to insure energization of the motors at the proper time.

What I claim is:

1. In the organization of a high-speed motor and a low-speed motor, each of said motors having a driven shaft and clutch means operatively associated with said shafts for coupling and uncoupling them, and control means operatively connected with said clutch means and movable from clutch-uncoupling to clutch-coupling position; the combination therewith of speed responsive means operatively connected with said high-speed motor and having a lower speed position and a higher speed position, and said last named means in said higher speed position having an operative association with said clutch control means preventing movement of the latter to clutch-coupling position.

2. The combination of claim 1 wherein said clutch means comprises mutually engageable parts rotatable respectively with said low speed and high speed motor shafts, said control means includes a part movable axially past a zone generally normal to said driven shaft of said high-speed motor as said part rotatable with said low-speed motor shaft is moved into driving engagement with said part rotatable with said high-speed motor shaft, and said last named means comprises an abutment mounted on said high speed motor shaft for movement radially outwardly in said zone at higher speeds of said high-speed motor shaft, and said abutment in a radially outer position blocking movement past said zone of said part rotatable with said low-speed shaft.

3. The combination of claim 2 including resilient means operatively associated with said abutment and urging the latter radially inwardly to a non-blocking position at safe coupling speed of said part rotatable with said high-speed motor shaft.

4. The combination of claim 1 including electrical circuit means for energizing each of said motors, and switch means operatively associated with said clutch means and said high-speed motor energizing circuit for energizing said last named circuit only when said clutch means is in clutch-uncoupling position.

5. In the organization of a high-speed motor and a low-speed motor, each of said motors having a driven shaft and clutch means operatively associated with said shafts for coupling and uncoupling them, and control means operatively connected with said clutch means and movable from clutch-uncoupling to clutch-coupling position; the combination therewith of a shaft of said high-speed motor, a part of said clutch means rotatively mounted on said shaft, said part having a hub extending axially along said shaft, a weight secured to said hub for rotation therewith and mounted on said hub for movement radially inwardly and outwardly thereof, spring means urging said weight inwardly, a shaft for said low-speed motor, a part of said clutch means rotatable with said last named shaft and movable axially thereof to a clutch-coupling position, a sleeve slidably mounted on said hub and connected with said last named part of said clutch means, said sleeve in clutch-coupling position being moved past the zone of movement of said weight, and said weight at a predetermined high speed of said first-named shaft being urged outwardly by centrifugal force against said spring means into a position blocking movement of said sleeve to clutch-coupling position.

References Cited in the file of this patent

UNITED STATES PATENTS

| | | |
|---|---|---|
| 431,649 | Currie | July 8, 1890 |
| 2,356,590 | Jacobsen | Aug. 22, 1944 |
| 2,666,863 | Davis et al. | Jan. 19, 1954 |

FOREIGN PATENTS

| | | |
|---|---|---|
| 620,085 | Great Britain | Mar. 18, 1949 |